Aug. 14, 1928. 1,680,544

H. W. INGLE

METHOD OF BLOWING GLASSWARE

Filed Dec. 6, 1923   2 Sheets-Sheet 1

INVENTOR
Henry W. Ingle
By Kay Totten & Brown,
Attorneys

Aug. 14, 1928.

H. W. INGLE 1,680,544

METHOD OF BLOWING GLASSWARE

Filed Dec. 6, 1923    2 Sheets-Sheet 2

INVENTOR
Henry W. Ingle,
By Kay, Totten & Brown,
Attorneys

Patented Aug. 14, 1928.

1,680,544

UNITED STATES PATENT OFFICE.

HENRY W. INGLE, OF HARTFORD, CONNECTICUT, ASSIGNOR TO HARTFORD-EMPIRE COMPANY, OF HARTFORD, CONNECTICUT, A CORPORATION OF DELAWARE.

METHOD OF BLOWING GLASSWARE.

Application filed December 6, 1923. Serial No. 678,914.

My invention relates to the manufacture of hollow glassware by the method wherein a blank or parison is formed in a parison mold and is thereafter expanded to final shape in a finishing mold.

The object of my invention is to simplify the process of making glassware by the parison method, by dispensing with the use of neck-rings and transfer mechanisms, and to improve the quality of the ware by shortening the time during which the parison is exposed to the air.

I accomplish these results by providing an inverted parison mold with which is associated a member which contributes to the formation of the parison and which is adapted to support the parison after the mold is removed. I also provide a finishing mold to close around the parison when the parison mold is removed and the parison is left supported at the parison-forming position. The parison may then be expanded in the finishing mold without moving it from its original position, or the finishng mold may be reverted to upright position and the glass may be expanded in the finishing mold after the usual interval of drawing down or elongation.

My invention also includes the provision of certain novel features of construction for carrying out the process outlined above, such structural features including a combined neck-forming and parison-supporting device which may have means for blowing air into the glass, and also a novel closure for the top of the parison mold, this closure including a plunger which may be moved vertically to press down the glass in the parison mold, and which may be provided with means for blowing air into the top of the parison mold.

Figure 1:
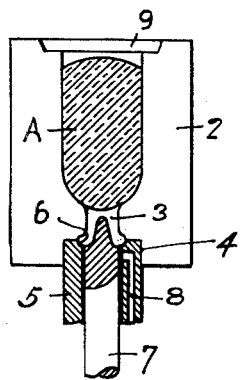
Figure 2:
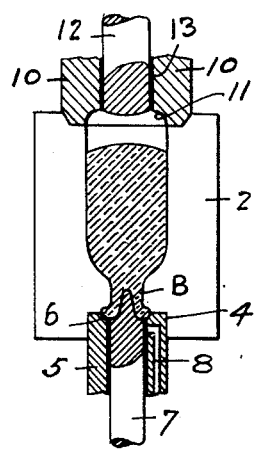
Figure 3:
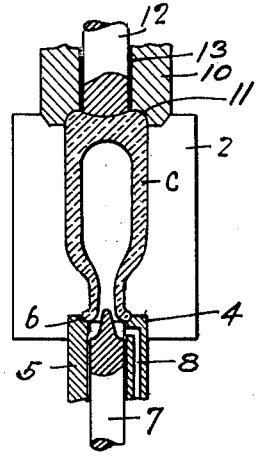
Figure 4:
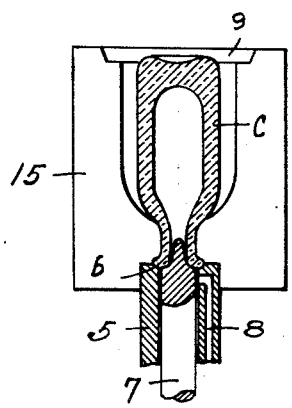
Figure 5:
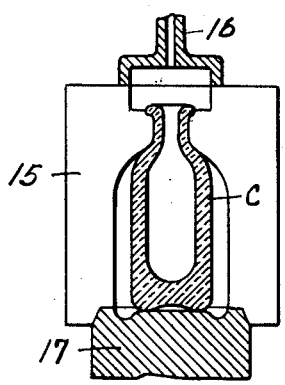
Figure 6:
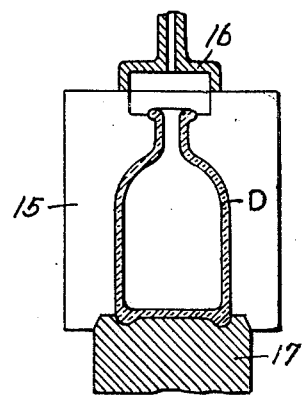
Figure 7:
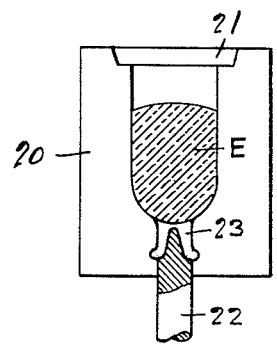
Figure 8:
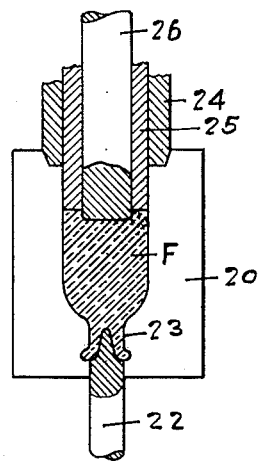
Figure 9:
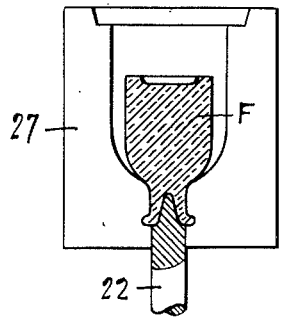
Figure 10:
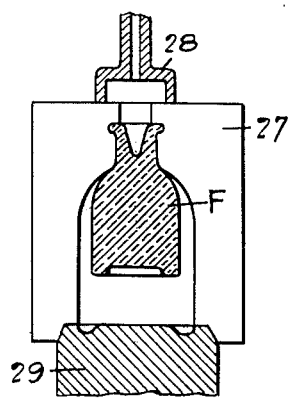
Figure 11:
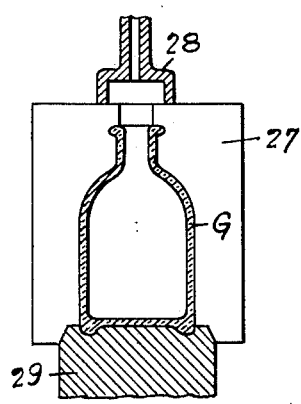

The figures of the accompanying drawing are a series of views illustrating, somewhat diagrammatically, the steps in which my invention is carried out. Fig. 1 shows a parison mold just after a charge of molten glass has been placed therein, this mold having a bottom closure provided with means for drawing down glass into the neck portion of the mold by suction; Fig. 2 shows the same apparatus with the addition of a top closure and with the glass forced into the neck portion of the mold cavity; Fig. 3 shows the same apparatus after the parison has been expanded within the mold; Fig. 4 shows the parison and the parison support after the exchange of molds; Fig. 5 shows the finishing mold reverted with the blow-head in blowing position; Fig. 6 shows the finished article expanded in the finishing mold; Figs. 7 and 8 are views similar to Figs. 1 and 2, respectively, showing a modified arrangement wherein the glass is pressed down in the parison mold by means of a plunger; Fig. 9 shows the parison of Fig. 8 and its support after the exchange of molds; and Figs. 10 and 11 are views similar to Figs. 5 and 6, respectively, showing the reversion of the finishing mold and the blowing of the finished article from the parison shown in Fig. 9.

In Figs. 1 to 3 of the drawing, the numeral 2 indicates a parison mold having a neck cavity 3, and also having a recess 4 adjacent to the neck cavity 3. A plunger sleeve 5 is adapted to fit within the recess 4 and the upper inner edge of the plunger sleeve 5 is cupped as shown at 6 so as to co-operate with the lower part of the neck cavity 3 to form the bead on the neck of the parison. Within the sleeve 5 is a plunger 7, the upper end of which is properly shaped to form the initial cavity in the parison. A channel 8 may be formed in the sleeve 5 and may be communicative with an annular space between the plunger 7 and the sleeve 5. The channel 8 may be connected to any suitable sources of suction and pressure, not shown, or, as a variation of this arrangement for introducing air into the mold around the plunger 7, the channel 8 may be omitted and the space between the plunger 7 and the sleeve 5 may be utilized as a channel for transmitting suction and pressure to the mold cavity, and may be connected in any suitable manner to sources of suction and pressure.

The top of the parison mold 2 is provided with a recess 9 to receive a closure device which is shown in Figs. 2 and 3 and which consists of a sleeve 10 having its lower inner edge shaped, as shown at 11, to assist in forming the bottom of the parison, and enclosing a member 12 which may or may not be arranged for vertical movement, and which is somewhat smaller than the inner diameter of the sleeve 10 so as to provide an annular channel 13 which may be connected to any suitable source of fluid pressure. Since all of the fluid pressure and suction connections may be such as are commonly employed in glass blowing machines, it is not considered necessary to illustrate them in this drawing.

In forming a parison by means of the apparatus of Figs. 1, 2 and 3, a mold charge A of molten glass is deposited in the parison mold 2 and the top closure of the mold is placed in position. The glass is then forced into the neck cavity 3 of the mold, and this may be done either by means of suction applied through the channel 8 or through the channel surrounding the plunger 7, or by means of fluid pressure applied through the channel 13 surrounding the member 12. Both of these suction and pressure methods may be used simultaneously, if desired. Fig. 2 shows the result of either of these operations, the glass being forced into the neck cavity 3 and a proper bead being formed on the neck of the parison by the co-operating surfaces of the neck cavity 3, the plunger sleeve 5 and the plunger 7.

Air under pressure is now forced through the channel 8 or through the annular channel surrounding the plunger 7, thereby expanding the glass to fill the parison mold as shown at C, Fig. 3.

When the parison C has been formed in this manner, the top closure of the mold is removed and the sections of the parison mold are swung apart, leaving the parison supported upon the sleeve 5 and the plunger 7. As soon as practicable after the parison mold has been removed, a finishing mold 15 is closed around the parison C as shown in Fig. 4.

Fig. 5 shows the finishing mold 15 reverted to upright position, with a blow head 16 applied to the top of the finishing mold, and a bottom closure 17 applied to the bottom of the mold. With the parts in this position, air is blown through the blow-head 16, thereby expanding the parison C into the finished form D shown in Fig. 6.

If desired, the step of reverting the finishing mold may be omitted and the article may be completed in the position shown in Fig. 4 by applying the closure member 17 while the mold is in this inverted position, and forcing air through the channel 8, thereby completing the article in one position.

Figs. 7 to 11 illustrate the stages of a method which is similar in a general way to the method just described in connection with Figs. 1 and 6, except that no air pressure is used in forming the parison, and a plunger is employed for forcing the glass into the neck portion of the mold cavity. Fig. 7 shows an inverted parison mold 20 having a recess 21 communicating with the upper part of the mold cavity and having a plunger 22 extending into the neck cavity 23 of the mold. A charge of molten glass is placed in the mold 20 as indicated at E, Fig. 7, and a plunger device is then placed in position in the recess 21, as shown in Fig. 8. This plunger device consists of a sleeve 24 within which is a movable plunger consisting of an annular portion 25 and a solid portion 26, the plunger portions 25 and 26 being relatively adjustable so as to shape the bottom of the parison as may be desired.

The combined plunger portions 25 and 26 are vertically movable as a unit within the sleeve 24. When this plunger device has been placed in the recess 21, the plunger portions are moved down, thereby forcing the glass to enter the neck cavity 23 of the mold 20, and the glass then presents the appearance shown at F, Fig. 8.

The parison mold 20 is then removed, leaving the parison F supported upon the plunger 22, and a finishing mold 27 is closed around the parison F as shown in Fig. 9. The article may be finished in this position or the finishing mold may be reverted to the upright position shown in Fig. 10, in which case a blow-head 28 is placed in position above the finishing mold and a bottom closure 29 is applied to the bottom of this mold, whereupon air under pressure is introduced through the blow-head 28 and the article is expanded to its final shape as shown at G, Fig. 11.

The system described above has numerous advantages, among which may be mentioned the simplicity of the apparatus which results from elimination of neck rings and transfer apparatus, and the increased speed at which the ware may be produced as a result of the elimination of the usual transfer step. Also, the distribution of the glass is made more uniform than in ware made by ordinary methods because the parison is exposed to the air for a short time only, and the danger of uneven chilling is therefore reduced.

The claims of this application are directed solely to the method of blowing glassware hereinbefore set forth, which method can be performed manually or automatically and by the use of a plurality of different instrumentalities. I reserved for another co-pending application, apparatus claims directed to the instrumentalities which are preferably used by me in performing this method.

It will be understood that the apparatus and process steps described above may be varied in many respects without departing from my invention, the scope of which is indicated in the appended claims.

I claim as my invention:

1. The process of making hollow glassware that comprises forming a parison in an inverted parison mold, removing the parison mold while leaving the parison supported at the parison-forming position, closing an inverted finishing mold around the said parison, reverting the said finishing mold containing said parison, and expanding said parison to fill the said finishing mold.

2. The process of making hollow glassware that comprises depositing a charge of molten glass in an inverted parison mold, forcing the lower part of said mold charge into the neck portion of said parison mold, expanding said mold charge to fill the parison mold, removing the parison mold while leaving the parison supported at the parison-forming position, closing an inverted finishing mold around said parison, reverting said finishing mold containing said parison, and expanding the said parison to fill the said finishing mold.

3. The process of making hollow glassware that comprises depositing a charge of molten glass in an inverted parison mold, forcing the said glass by differential air pressure to fill the neck cavity of the said mold, expending the said mold-charge to fill the said parison mold, removing the said parison mold while leaving the parison supported at the parison-forming position, closing an inverted finishing mold around the said parison, reverting said finishing mold and expanding the said parison to fill the said finishing mold.

4. The process of making hollow glassware that comprises depositing a charge of molten glass in an inverted parison mold, applying suction at the lower portion of said mold to cause the glass to fill the neck cavity of said mold, forcing air under pressure into said mold from beneath, thereby expanding said mold charge to fill the parison mold, removing said parison mold while leaving the parison supported at the parison-forming position, closing an inverted finishing mold around the parison, reverting and finishing mold, and expanding the parison to fill the said finishing mold.

5. The process of making hollow glassware that comprises depositing a charge of molten glass in an inverted parison mold, applying pressure from above to the said mold charge, thereby causing the glass to fill the neck cavity of the said parison mold, introducing air under pressure into the parison from below, thereby expanding the glass to fill the parison mold, removing the parison mold while leaving the parison supported at the parison-forming position, closing a finishing mold around the parison, reverting said finishing mold, and expanding the parison to fill the said finishing mold.

In testimony whereof I, the said HENRY W. INGLE, have hereunto set my hand.

HENRY W. INGLE.